(12) United States Patent
Shimizu et al.

(10) Patent No.: US 12,101,202 B2
(45) Date of Patent: *Sep. 24, 2024

(54) ONBOARD DEVICE AND SLEEP CONTROL METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yosuke Shimizu, Yokkaichi (JP); Kentaro Ashibe, Yokkaichi (JP); Takeshi Hagihara, Yokkaichi (JP); Daiki Nakayama, Osaka (JP); Tatsuya Izumi, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/907,570

(22) PCT Filed: Mar. 15, 2021

(86) PCT No.: PCT/JP2021/010313
§ 371 (c)(1),
(2) Date: Sep. 28, 2022

(87) PCT Pub. No.: WO2021/200064
PCT Pub. Date: Oct. 7, 2021

(65) Prior Publication Data
US 2023/0147005 A1 May 11, 2023

(30) Foreign Application Priority Data
Mar. 31, 2020 (JP) ................................ 2020-062820

(51) Int. Cl.
*H04L 12/40* (2006.01)

(52) U.S. Cl.
CPC .................. *H04L 12/40169* (2013.01); *H04L 2012/40273* (2013.01)

(58) Field of Classification Search
CPC ............... H04L 12/40169; H04L 12/12; H04L 12/40039; H04L 12/46; H04L 2012/40273;
(Continued)

(56) References Cited

U.S. PATENT DOCUMENTS 10,191,533 B2 * 1/2019 Chu ...................... G06F 1/3221
10,850,685 B2 * 12/2020 Bessho ............... H04L 12/5601
(Continued)

FOREIGN PATENT DOCUMENTS

JP 2005-026906 A 1/2005
JP 2008071079 A 3/2008
(Continued)

OTHER PUBLICATIONS

Axer, Phillip et al. "OPEN Sleep/Wake-up Specification", OPEN Alliance, Mar. 7, 2019, pp. 9-10.
(Continued)

*Primary Examiner* — Rasheed Gidado
(74) *Attorney, Agent, or Firm* — Honigman LLP

(57) ABSTRACT

An onboard device includes: a communication unit configured to communicate with an onboard device included in an onboard network; a detection unit configured to detect a new onboard device that is an onboard device newly added to the onboard network; and a sleep processing unit configured to, in a detected state where the new onboard device has been detected by the detection unit, transmit a sleep request for transitioning to a sleep state in synchronization with an
(Continued)

onboard device included in the onboard network, to the new onboard device via the communication unit.

7 Claims, 7 Drawing Sheets

(58) Field of Classification Search
CPC . H04L 2012/40215; H04L 2012/40234; H04L 2012/40241; H02J 7/0063; H02J 7/00; H02J 7/04
See application file for complete search history.

(56) References Cited

U.S. PATENT DOCUMENTS

| | | | |
|---|---|---|---|
| 2015/0304954 A1* | 10/2015 | Korenaga | H04W 52/0254 370/311 |
| 2017/0096124 A1* | 4/2017 | Watanabe | H04W 4/027 |
| 2017/0147812 A1* | 5/2017 | Ujiie | H04L 63/20 |
| 2018/0295011 A1* | 10/2018 | Wang | H04L 41/0833 |
| 2021/0278813 A1 | 9/2021 | Ishikawa | |
| 2023/0147005 A1 | 5/2023 | Shimizu et al. | |

FOREIGN PATENT DOCUMENTS

| | | |
|---|---|---|
| JP | 2009-177785 A | 8/2009 |
| JP | 2013-090025 A | 5/2013 |
| JP | 2013-141152 A | 7/2013 |
| JP | 2014-083917 A | 5/2014 |
| JP | 7380391 B2 | 11/2023 |
| WO | 2018084004 A1 | 5/2018 |

OTHER PUBLICATIONS

International Search Report, Application No. PCT/JP2021/010313, mailed Apr. 27, 2021. ISA/Japan Patent Office.

* cited by examiner

FIG. 4

| COMMUNICATION PORT | A | B | C | D | E |
|---|---|---|---|---|---|
| FUNCTION OF ONBOARD DEVICE | SUPPORT | SUPPORT | SUPPORT | NOT SUPPORT | NOT CONNECT |

FIG. 5

|        | PORT A | PORT B | PORT C | PORT D | PORT E |
|--------|--------|--------|--------|--------|--------|
| PORT A | —      | ○      | ○      | ×      | —      |
| PORT B | ○      | —      | ×      | ×      | —      |
| PORT C | ×      | ○      | —      | ×      | —      |
| PORT D | ×      | ×      | ×      | —      | —      |
| PORT E | —      | —      | —      | —      | —      |

ONBOARD DEVICE AND SLEEP CONTROL METHOD

CROSS-REFERENCE TO RELATED APPLICATIONS

This application is the U.S. national stage of PCT/JP2021/010313 filed on Mar. 15, 2021, which claims priority of Japanese Patent Application No. JP 2020-062820 filed on Mar. 31, 2020, the contents of which are incorporated herein.

TECHNICAL FIELD

The present disclosure relates to an onboard device and a sleep control method.

BACKGROUND

Philip Axer (NXP), Charles Hong (Realtek), Antony Liu (Realtek), "OPEN Sleep/Wake-up Specification", OPEN ALLIANCE, Mar. 7, 2019, p. 9-10 (Non-Patent Document 1) discloses a technique for performing sleep control on an ECU in an onboard Ethernet.

Conventionally, a technique for saving power by performing sleep control on onboard devices such as an ECU (Electronic Control Unit) in an onboard network has been developed.

In an onboard network, various onboard devices may be added or removed according to the needs of the user.

If an onboard device newly added to the onboard network does not have the sleep function disclosed in Non-patent Document 1, for example, when processing is performed for the entire onboard network to transition to a sleep state in order to perform anomaly handling or maintenance work or the like, for example, the processing may fail unexpectedly.

The present disclosure is made to solve the above problem, and an objective thereof is to provide an onboard device and a sleep control method that realize more reliable sleep control on onboard devices in an onboard network.

SUMMARY

An onboard device according to the present disclosure includes: a communication unit configured to communicate with an onboard device included in an onboard network; a detection unit configured to detect a new onboard device that is an onboard device newly added to the onboard network; and a sleep processing unit configured to, in a detected state where the new onboard device has been detected by the detection unit, transmit a sleep request for transitioning to a sleep state in synchronization with an onboard device included in the onboard network, to the new onboard device via the communication unit.

A sleep control method according to the present disclosure is a sleep control method for an onboard device that is capable of communicating with another onboard device included in an onboard network, the sleep control method including the steps of; detecting a new onboard device that is an onboard device newly added to the onboard network; and in a detected state where the new onboard device has been detected, transmitting a sleep request for transitioning to a sleep state in synchronization with an onboard device included in the onboard network, to the new onboard device.

One aspect of the present disclosure can be realized not only as an onboard device that includes such characteristic processing units, but also as a program for enabling a computer to carry out such characteristic processing steps. Also, one aspect of the present disclosure can be realized as a semiconductor integrated circuit that realizes a part or the entirety of the onboard device, or can be realized as a system that includes the onboard device.

Advantageous Effects of the Disclosure

With the present disclosure, it is possible to more reliably perform sleep control on onboard devices in an onboard network.

BRIEF DESCRIPTION OF THE DRAWINGS

FIG. 4 is a diagram showing an example of sleep function information in the relay device according to the embodiment of the present disclosure.

FIG. 5 is a diagram showing an example of transfer information in the relay device according to the embodiment of the present disclosure.

DETAILED DESCRIPTION OF PREFERRED EMBODIMENTS

Figure 1:
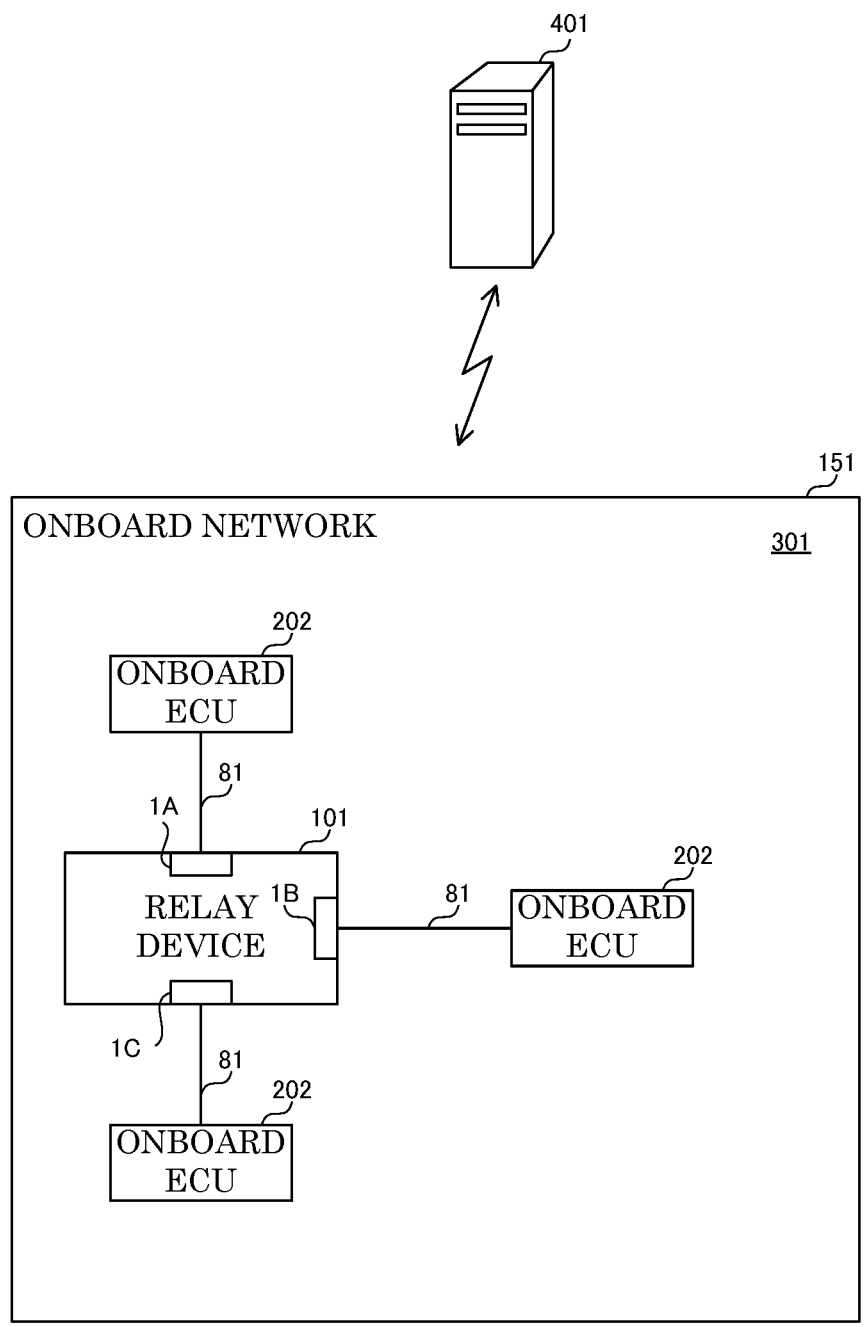
FIG. 1 is a diagram showing a configuration of an onboard system according to an embodiment of the present disclosure.

First, the details of an embodiment of the present disclosure are listed and described.

An onboard device according to an embodiment of the present disclosure is an onboard device including: a communication unit configured to communicate with an onboard device included in an onboard network; a detection unit configured to detect a new onboard device that is an onboard device newly added to the onboard network; and a sleep processing unit configured to, in a detected state where the new onboard device has been detected by the detection unit, transmit a sleep request for transitioning to a sleep state in synchronization with an onboard device included in the onboard network, to the new onboard device via the communication unit.

With such a configuration, it is possible to check in advance whether or not the onboard device newly added to the onboard network has a sleep function for transitioning to a sleep state in synchronization with other onboard devices. Therefore, for example, when processing is to be performed to cause the entire onboard network to transition to a sleep state in order to perform anomaly handling, maintenance work, or the like, for example, the processing can be prevented from failing unexpectedly. Therefore, it is possible to more reliably perform sleep control on onboard devices in an onboard network.

Preferably, the sleep processing unit is configured to store sleep function information in a storage unit, the sleep function information indicating whether or not the communication unit has received a sleep response corresponding to the sleep request transmitted in the detected state, from the new onboard device.

With such a configuration, using sleep function information regarding one or more onboard devices, it is possible to perform appropriate processing according to the past results of checking whether or not each onboard device has the above-described sleep function.

Preferably, the communication unit is configured to stop operating in the sleep state, and the sleep processing unit is configured to, in the detected state, when the communication unit receives, from the new onboard device, a sleep response corresponding to the sleep request, perform control so as not to allow the communication unit to transition to the sleep state.

With such a configuration, in a detected state, it is possible to prevent the communication unit from erroneously transitioning to a sleep state, by performing simple processing.

Preferably, the sleep processing unit is configured to, in the detected state, when the communication unit receives, from the new onboard device, a sleep response corresponding to the sleep request, transmit a wake-up request for causing an onboard device included in the onboard network to transition from a sleep state to a wake-up state, to the new onboard device via the communication unit.

With such a configuration, in a detected state, it is possible to prevent the new onboard device from erroneously transitioning to a sleep state, by performing simple processing.

A sleep control method according to an embodiment of the present disclosure is a sleep control method for an onboard device that is capable of communicating with another onboard device included in an onboard network, the sleep control method including the steps of: detecting a new onboard device that is an onboard device newly added to the onboard network; and in a detected state where the new onboard device has been detected, transmitting a sleep request for transitioning to a sleep state in synchronization with an onboard device included in the onboard network, to the new onboard device.

With such a configuration, it is possible to check in advance whether or not the onboard device newly added to the onboard network has a sleep function for transitioning to a sleep state in synchronization with other onboard devices. Therefore, for example, when processing is to be performed to cause the entire onboard network to transition to a sleep state in order to perform anomaly handling, maintenance work, or the like, for example, the processing can be prevented from failing unexpectedly. Therefore, it is possible to more reliably perform sleep control on onboard devices in an onboard network.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

FIG. 1 is a diagram showing a configuration of an onboard system according to an embodiment of the present disclosure. As shown in FIG. 1, an onboard system 301 is mounted on a vehicle, and includes a relay device 101 and one or more onboard ECUs 202.

Note that the onboard system 301 may include a plurality of relay devices 101. FIG. 1 shows an example in which the onboard system 301 includes one relay device 101 and three onboard ECUs 202.

Each onboard ECU 202 is, for example, a TCU (Telematics Control Unit), an autonomous driving ECU, an engine ECU, a sensor, a navigation device, a human-machine interface, a camera, or the like. The TCU communicates with a device outside the vehicle, such as a server 401, via a wireless base station (not shown) or the like.

The relay device 101 is, for example, a gateway device, and is capable of relaying information between the plurality of onboard ECUs 202 connected thereto. More specifically, the relay device 101 can perform relay processing according to Layer 2 of the OSI (Open Systems Interconnection) reference model, for example. Note that the relay device 101 may be configured to perform relay processing according to Layer 3, which is higher than Layer 2, in addition to Layer 2.

The relay device 101 and the onboard ECUs 202 are included in an onboard network 151. The onboard ECUs 202 and the relay device 101 are examples of onboard devices included in the onboard network 151. The connection relationship between the onboard devices included in the onboard network 151 is fixed, for example.

In the onboard network 151, the onboard ECUs 202 are respectively connected to the relay device 101 via Ethernet (registered trademark) cables 81, for example. More specifically, the relay device 101 includes communication ports 1A, 1B, and 1C, which are each referred to as a communication port 1. The communication ports 1A, 1B, and 1C are, for example, terminals to which the Ethernet cables 81 can be respectively connected. The three onboard ECUs 202 are respectively connected to the communication ports 1A, 1B, and 1C of the relay device 101 via the Ethernet cables 81 corresponding thereto.

The relay device 101 performs processing to relay Ethernet frames according to the Ethernet communication standard. Specifically, the relay device 101 relays Ethernet frames that are exchanged between the onboard ECUs 202, for example. Each Ethernet frame stores an IP packet.

Note that the onboard system 301 is not limited to being configured to relay Ethernet frames according to the Ethernet communication standard, and may be configured to relay data according to a communication standard such as CAN (Controller Area Network) (registered trademark), FlexRay (registered trademark), MOST (Media Oriented Systems Transport) (registered trademark), LIN (Local Interconnect Network), or the like, for example.

Each device included in the onboard system according to the embodiment of the present disclosure is provided with a computer that includes a memory. An arithmetic processing unit such as a CPU (Central Processing Unit) in the computer reads out a program that includes some or all of the steps of the following flowchart and sequence from the memory, and executes the program. Programs for the plurality of devices can be respectively installed to the devices from outside the devices. Each of the programs for the plurality of devices is distributed in the state of being stored in a recording medium.

Figure 2:
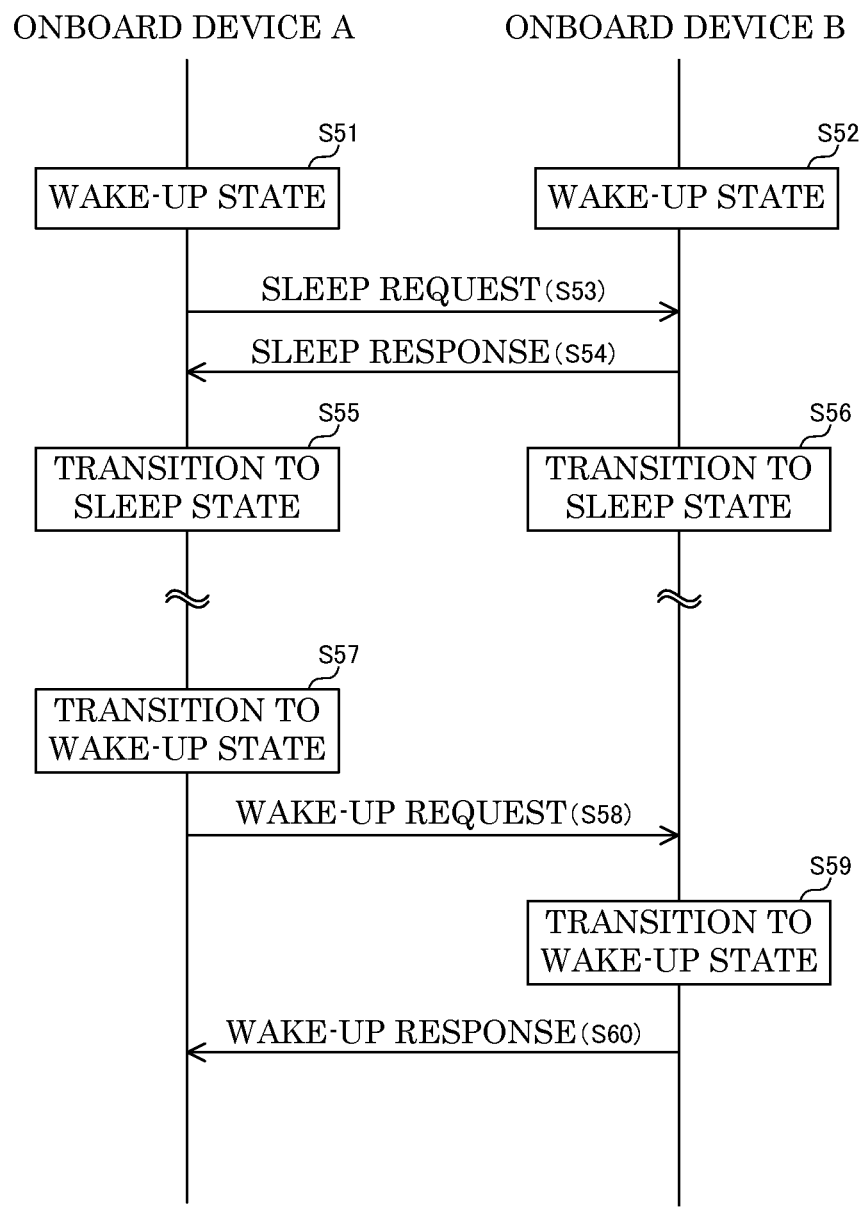
FIG. 2 is a diagram showing an example of a sequence of sleep processing in the onboard system according to the embodiment of the present disclosure.

FIG. 2 is a diagram showing an example of a sequence of sleep processing in the onboard system according to the embodiment of the present disclosure.

As shown in FIG. 2, first, when an onboard device A and an onboard device B are in a wake-up state (steps S51 and S52), the onboard device A transmits a sleep request to the onboard device B to transition to a sleep state in synchronization with the onboard device B (step S53).

Next, the onboard device B receives the sleep request from the onboard device A, transmits a sleep response to the onboard device A (step S54), and transitions to a sleep state upon a predetermined time TB elapsing after transmitting the sleep response. In a sleep state, the onboard device B stops the operation of some devices (step S56), for example.

Also, when receiving a sleep response from the onboard device B, the onboard device A transitions to a sleep state upon a predetermined time TA elapsing after transmitting the sleep request to the onboard device B. In a sleep state, the onboard device A stops the operation of some devices (step S55), for example. The predetermined times TA and TB have the same value of several tens of milliseconds, for example.

Thereafter, the onboard device A transitions to a wake-up state (step S57), and transmits a wake-up request to the onboard device B (step S58).

Next, the onboard device B receives the wake-up request from the onboard device A, transitions to a wake-up state (step S59), and transmits a wake-up response to the onboard device A (step S60).

Note that, if the onboard device A does not receive a sleep response from the onboard device B even after the predetermined time has elapsed from when the onboard device A transmitted the sleep request to the onboard device B, sleep processing fails.

In the onboard system 301, a sleep request, a sleep response, a wake-up request, and a wake-up response are transmitted via the Ethernet cables 81, for example. With such a configuration, there is no need to prepare dedicated lines for transmitting the above-described pieces of control information in sleep processing, and the configuration of the onboard network 151 can be simplified. The sleep processing disclosed in Non-patent Document 1 is an example of such sleep processing.

Figure 3:
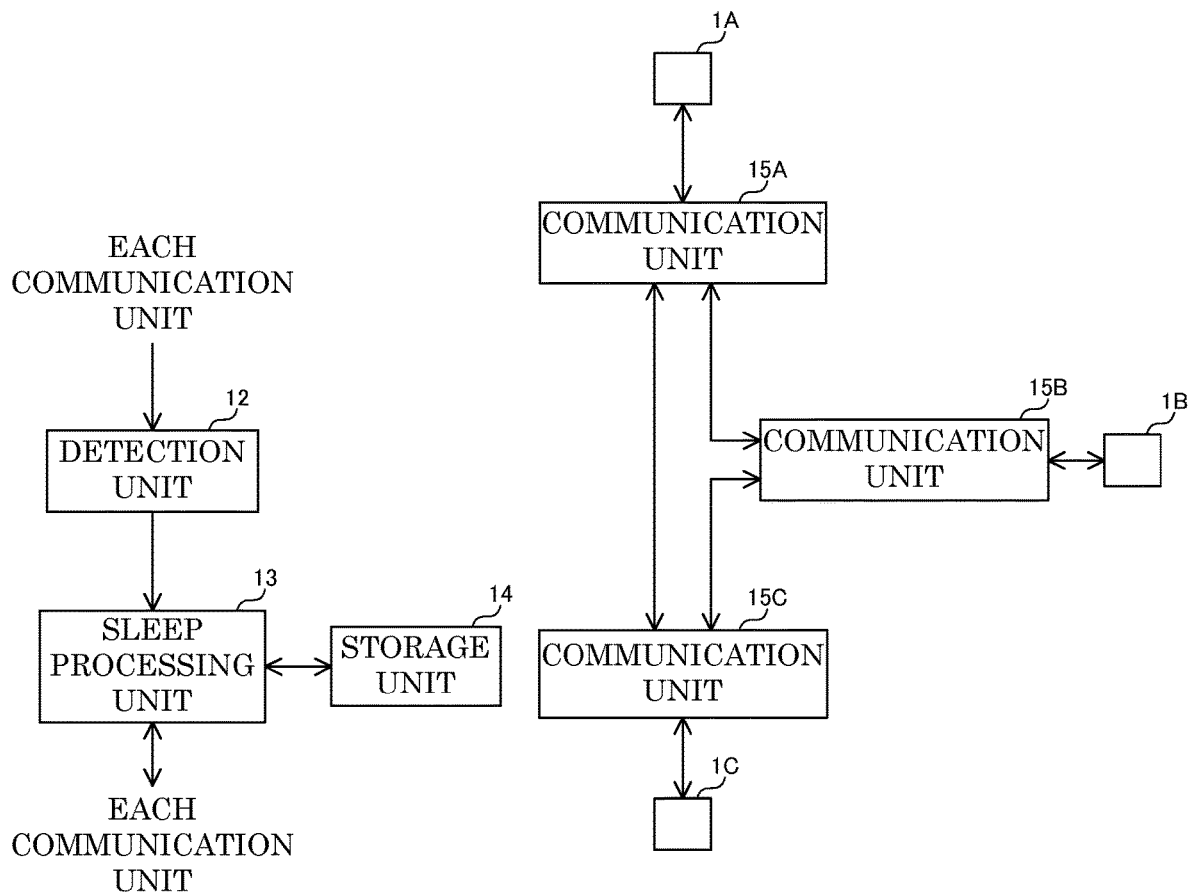
FIG. 3 is a diagram showing a configuration of a relay device included in the onboard system according to the embodiment of the present disclosure.

FIG. 3 is a diagram showing a configuration of a relay device included in the onboard system according to the embodiment of the present disclosure. As shown in FIG. 3, the relay device 101 includes a detection unit 12, a sleep processing unit 13, a storage unit 14, and one or more communication units 15. FIG. 3 shows an example in which the relay device 101 is provided with three communication units 15A, 15B, and 15C respectively corresponding to the communication ports 1A, 1B, and 1C. Note that the storage unit 14 may be provided outside the relay device 101.

The detection unit 12 and the sleep processing unit 13 are each realized using a processor such as a CPU, a DSP (Digital Signal Processing), or the like, for example. The communication units 15 are each realized using a communication circuit such as a communication IC (Integrated Circuit), for example. The storage unit 14 is a non-volatile memory, for example.

Each communication unit 15 performs processing to relay Ethernet frames between the onboard ECUs 202. More specifically, upon each communication unit 15 receiving an Ethernet frame from a given onboard ECU 202 via the Ethernet cable 81 and the communication port 1 corresponding thereto, the communication unit 15 transmits the received Ethernet frame to the onboard ECU 202 at the transmission destination via the communication unit 15, the communication port 1, and the Ethernet cable 81 corresponding thereto.

Sleep Processing

The sleep processing unit 13 outputs a sleep request to the communication unit 15 corresponding to the onboard ECU 202 at the transmission destination. The communication unit 15 stores the sleep request received from the sleep processing unit 13 in an Ethernet frame, and transmits the Ethernet frame to the onboard ECU 202 via the communication port 1 and the Ethernet cable 81.

The communication unit 15 receives the sleep response corresponding to the sleep request, transmitted from the onboard ECU 202, via the Ethernet cable 81 and the communication port 1.

The sleep processing unit 13 receives the sleep response corresponding to the sleep request, transmitted from the onboard ECU 202, via the communication unit 15. If the sleep processing unit 13 receives the sleep response, upon a predetermined time elapsing after the sleep processing unit 13 transmitted the sleep request to the onboard ECU 202, the sleep processing unit 13 transitions to a sleep state to stop the operation of some of the units in the relay device 101. Note that the communication unit 15 may be configured to transition to a sleep state by itself to stop some of the functions thereof upon receiving a sleep response.

When returning from a sleep state to a wake-up state, the sleep processing unit 13 outputs a wake-up request to the communication unit 15, restarts the operation of the units that have been stopped in the relay device 101, and transitions to a wake-up state.

The communication unit 15 stores the wake-up request received from the sleep processing unit 13 in an Ethernet frame, and transmits the Ethernet frame to the onboard ECU 202 via the communication port 1 and the Ethernet cable 81. The communication unit 15 receives the wake-up response corresponding to the wake-up request, transmitted from the onboard ECU 202, via the Ethernet cable 81 and the communication port 1, and outputs the wake-up response to the sleep processing unit 13.

Processing to be Performed at Addition of New Onboard Device

When a new onboard device, which is an onboard ECU 202 that is to be newly added to the onboard network 151, is connected to the relay device 101 corresponding to the communication unit 15 via the communication port 1 and the Ethernet cable corresponding thereto, the communication unit 15 exchanges one or more pieces of communication information with the new onboard device to establish a communication connection. If a communication connection with the new onboard device is established, the communication unit 15 updates the register value thereof from "NOT CONNECTED" to "CONNECTED", or notifies the detection unit 12 of the fact that a communication connection has been established.

The detection unit 12 detects the new onboard device that has been newly added to the onboard network 151. More specifically, the detection unit 12 periodically or irregularly reads the register value of the communication unit 15, or receives a notification indicating that a communication connection has been established, from the communication unit 15, thereby detecting that the new onboard device has been connected to the communication port 1 corresponding to the communication unit 15. For example, the detection unit 12 outputs detection information indicating the fact that the new onboard device has been connected, and the communication port 1 corresponding thereto, to the sleep processing unit 13.

The sleep processing unit 13 receives the detection information from the detection unit 12, transitions from an undetected state to a detected state regarding the communication port 1 indicated by the received detection information, and transmits a sleep request to the new onboard device via the communication unit 15 corresponding thereto. For example, the sleep processing unit 13 stores, in the storage unit 14, sleep function information that indicates, for each communication port 1, whether or not the communication unit 15 has received a sleep response corresponding to a sleep request that has been transmitted in a detected state, from the new onboard device.

FIG. 4 is a diagram showing an example of sleep function information in the relay device according to the embodiment of the present disclosure. FIG. 4 shows the case in which the relay device 101 has five communication ports 1, namely communication ports A to E.

As shown in FIG. 4, sleep function information indicates a correspondence relationship between each communication port and the functions of the onboard ECU 202 connected to the communication port. Specifically, the onboard ECUs 202 connected to the communication ports A, B, and C have the sleep processing function shown in FIG. 2, the onboard ECU 202 connected to the communication port D does not have the sleep processing function shown in FIG. 2, and no onboard ECU 202 is connected to the communication port E.

FIG. 5 is a diagram showing an example of transfer information in the relay device according to the embodiment of the present disclosure. FIG. 5 shows the case in which the relay device 101 has five communication ports 1, namely communication ports A to E.

As shown in FIG. 5, transfer information indicates a setting regarding which communication port the sleep request and the wake-up request received by the transmitter-side communication port is to be relayed to.

If the content of sleep function information is as shown in FIG. 4, the communication port D to which the onboard ECUs 202 that does not have the sleep processing function shown in FIG. 2 is connected, and the communication port E to which no onboard ECU 202 is connected, are excluded from the transmission destinations and the reception sources of a sleep request and a wake-up request in the transfer information, respectively.

For example, the sleep processing unit 13 creates or updates such transfer information, and stores the transfer information in the storage unit 14.

Each communication unit 15 references the transfer information in the storage unit 14, and relays the sleep request and the wake-up request received from the onboard ECU 202 to another onboard ECU 202. Note that each communication unit 15 may be configured to reference the transfer information and transmit the sleep request and the wake-up request generated by the sleep processing unit 13 to the onboard ECU 202.

As described above, using sleep function information, it is possible to grasp whether or not each onboard ECU 202 has the function to perform the sleep processing shown in FIG. 2, and therefore it is possible to precisely determine detailed settings regarding the transfer of a sleep request and a wake-up request.

Also, using sleep function information, the sleep processing unit 13 can disable the sleep processing function thereof for onboard ECUs 202 that do not have the function to perform the sleep processing shown in FIG. 2, and causes only the relay device 101 thereof to transition to a sleep state.

Again, as shown in FIG. 3, for example, if a communication unit 15 receives a sleep response from a new onboard device in a detected state, the sleep processing unit 13 performs control so as not to allow the communication unit 15 to transition to a sleep state. Specifically, for example, the sleep processing unit 13 continues the operation of the units in the relay device 101 even if the sleep processing unit 13 receives a sleep response from the communication unit 15. Alternatively, if the communication unit 15 is configured to transition to a sleep state by itself, the sleep processing unit 13 receives a sleep response from the communication unit 15 and outputs a wake-up retention request to the communication unit 15, for example. The communication unit 15 receives the wake-up retention request from the sleep processing unit 13, and continues the operation thereof without transitioning to a sleep state.

Also, for example, if the communication unit 15 receives a sleep response from a new onboard device in a detected state, the sleep processing unit 13 transmits a wake-up request for causing an onboard device included in the onboard network 151 to transition from a sleep state to a wake-up state, to the new onboard device via the communication unit 15 corresponding thereto.

The new onboard device receives the wake-up request from the relay device 101 within a predetermined time from when transmitting the sleep response, and retains the wake-up state.

If the communication unit 15 receives a sleep response corresponding to the sleep request from the new onboard device in a detected state, or a predetermined time has elapsed after transmitting the sleep request to the new onboard device in a detected state, the sleep processing unit 13 sets the new onboard device as an existing onboard device included in the onboard network 151, and transitions from a detected state to a normal state regarding the communication port 1 corresponding thereto.

Figure 6:
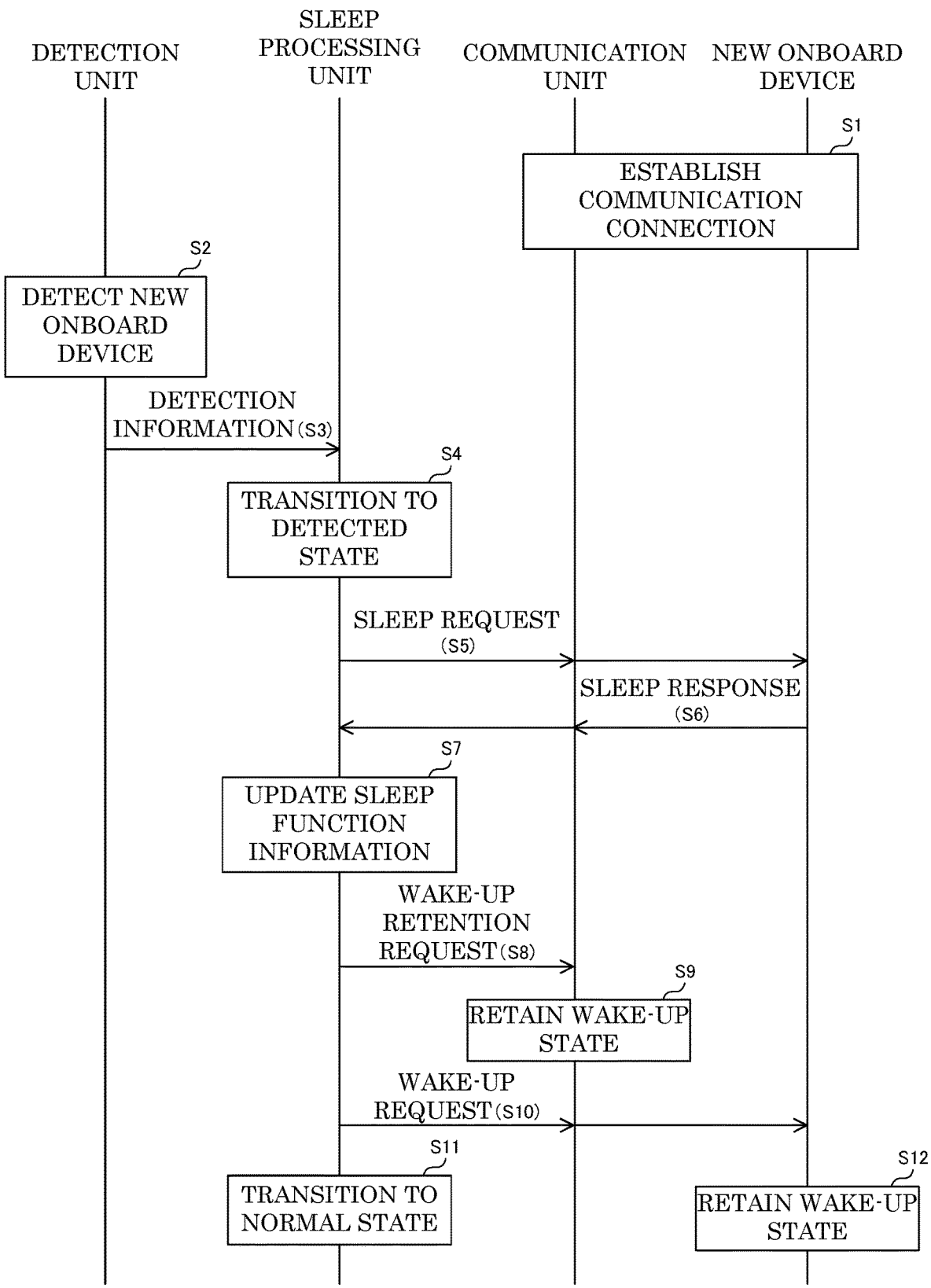
FIG. 6 is a diagram showing an example of a sequence of new onboard device addition processing in the onboard system according to the embodiment of the present disclosure.

FIG. 6 is a diagram showing an example of a sequence of new onboard device addition processing in the onboard system according to the embodiment of the present disclosure. FIG. 6 shows an example in which an onboard ECU 202 that has the sleep processing function shown in FIG. 2 is newly added to the onboard network 151.

As shown in FIG. 6, first, a communication connection is established between a communication unit 15 in the relay device 101 and the new onboard device (step S1).

Next, the detection unit 12 detects the new onboard device (step S2), and outputs detection information indicating the communication port 1 corresponding thereto, to the sleep processing unit 13 (step S3).

Next, the sleep processing unit 13 receives the detection information from the detection unit 12, transitions from an undetected state to a detected state regarding the communication port 1 indicated by the received detection information (step S4), and transmits a sleep request to the new onboard device via the communication unit 15 corresponding thereto (step S5).

Next, the new onboard device receives the sleep request from the relay device 101, and transmits a sleep response to the relay device 101 (step S6).

Next, the sleep processing unit 13 receives the sleep response from the new onboard device via the communication unit 15, and changes the state of the communication port 1 corresponding thereto from "NOT CONNECTED" to "SUPPORTED" in the sleep function information stored in the storage unit 14 (step S7).

Next, the sleep processing unit 13 outputs a wake-up retention request to the communication unit 15 (step S8).

Next, the communication unit 15 receives the wake-up retention request from the sleep processing unit 13, and continues the operation thereof without transitioning to a sleep state (step S9).

Next, the sleep processing unit 13 transmits a wake-up request to the new onboard device via the communication unit 15 (step S10), transitions to a normal state regarding the communication port 1 corresponding thereto, and sets the new onboard device as an existing onboard device included in the onboard network 151 (step S11).

Also, the new onboard device receives the wake-up request from the relay device 101 within a predetermined time from when transmitting the sleep response, and retains the wake-up state (step S12).

Figure 7:
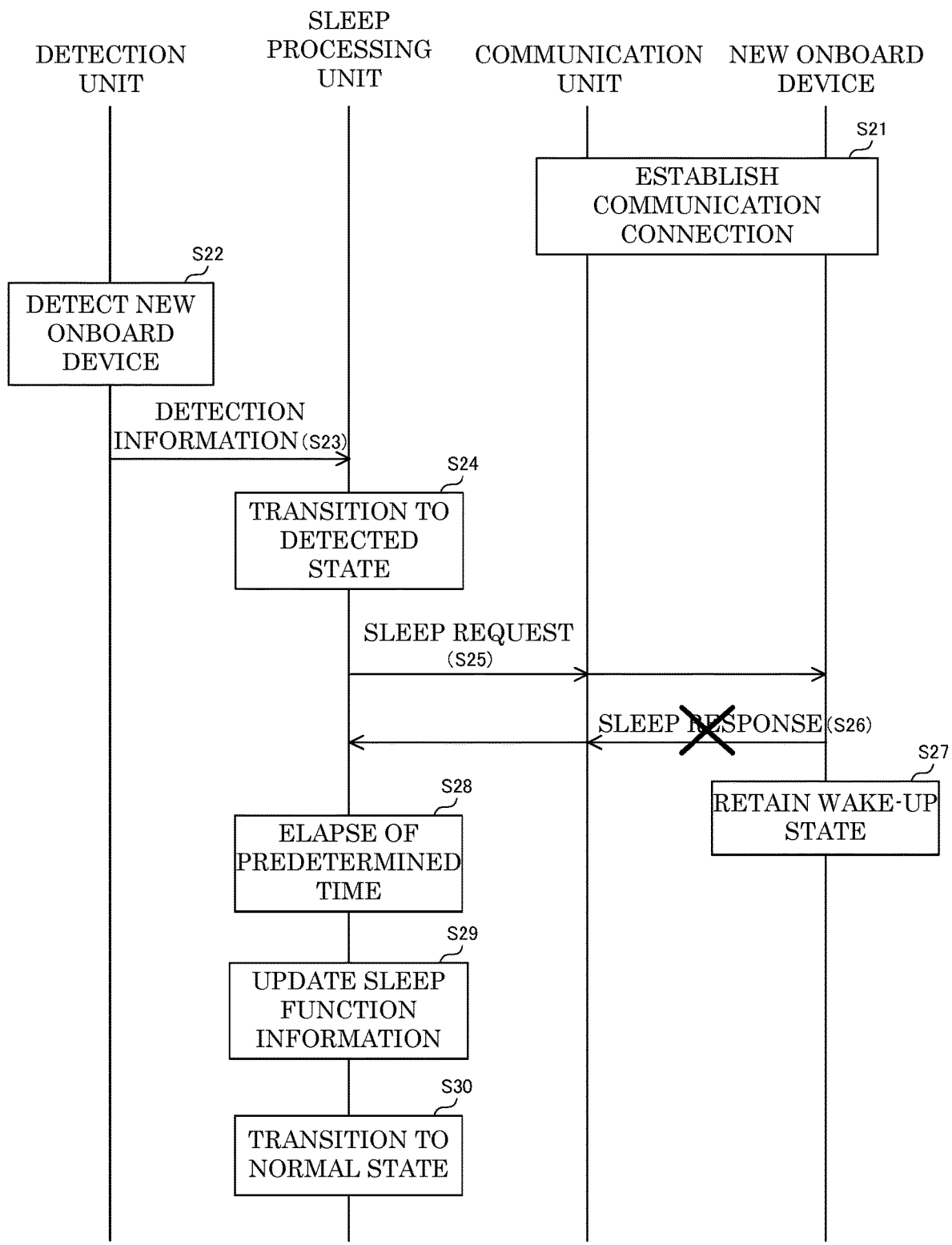
FIG. 7 is a diagram showing another example of a sequence of new onboard device addition processing in the onboard system according to the embodiment of the present disclosure.

FIG. 7 is a diagram showing another example of a sequence of new onboard device addition processing in the onboard system according to the embodiment of the present disclosure. FIG. 7 shows an example in which an onboard ECU 202 that does not have the sleep processing function shown in FIG. 2 is newly added to the onboard network 151.

As shown in FIG. 7, the operations in steps S21 to S25 are the same as the operations in steps S1 to S5 shown in FIG. 6, respectively.

Next, since the new onboard device does not have the function of performing the sleep processing shown in FIG. 2, the new onboard device does not transmit a sleep response even when a sleep request is transmitted thereto from the relay device 101 (step S26), and retains a wake-up state (step S27).

Next, since the sleep processing unit 13 has not received a sleep response from the new onboard device even after the predetermined time has elapsed from when the sleep processing unit 13 transmitted the sleep request to the new onboard device (step S28), the sleep processing unit 13 sets the new onboard device as an existing onboard device included in the onboard network 151 (step S29), and transitions to a normal state regarding the communication port 1 corresponding thereto (step S30).

In the onboard system according to the embodiment of the present disclosure, the relay device 101 is configured to create or update sleep function information. However, the present disclosure is not limited to such a configuration. It is possible to employ a configuration with which a device other than the relay device 101 monitors whether or not a sleep response corresponding to a sleep request in a detected state has been received from a new onboard device, and creates or updates sleep function information, for example.

In the onboard system according to the embodiment of the present disclosure, the sleep processing unit 13 is configured to perform control so as not to allow a communication unit 15 to transition to a sleep state when the communication unit 15 receives a sleep response from a new onboard device, in a detected state. However, the present disclosure is not limited to such a configuration. It is possible to employ a configuration with which the communication unit 15 recognizes the detected state by itself, and does not transition to a sleep state even if the communication unit 15 receives a sleep response from a new onboard device.

In the onboard system according to the embodiment of the present disclosure, the sleep processing unit 13 is configured so that, if a communication unit 15 receives a sleep response from a new onboard device in a detected state, the sleep processing unit 13 transmits a wake-up request to the new onboard device. However, the present disclosure is not limited to such a configuration. For example, the sleep processing unit 13 may be configured so that, if a new onboard device has the function of not transitioning to a sleep state even if the new onboard device receives the initial sleep request after being started up, the sleep processing unit 13 does not transmit a wake-up request to the new onboard device in a detected state.

In the onboard system according to the embodiment of the present disclosure, the relay device 101 includes the detection unit 12 and the sleep processing unit 13. However, the present disclosure is not limited to such a configuration. Another onboard device such as an onboard ECU 202 that does not have a relay function may include the detection unit 12 and the sleep processing unit 13 and be configured to perform the above-described processing on a new onboard device. If this is the case, the onboard system 301 may have a configuration that does not include the relay device 101.

In the onboard system according to the embodiment of the present disclosure, the relay device 101 is configured to perform the above-described processing on the new onboard device connected directly thereto. However, the present disclosure is not limited to such a configuration. Each onboard device may be configured to perform processing, such as transmission of a sleep request in a detected state, on a new onboard device that is not connected directly thereto, via the relay device 101 or the like.

Incidentally, if an onboard device newly added to the onboard network does not have the sleep function disclosed in Non-patent Document 1, for example, when processing is performed to cause the entire onboard network to transition to a sleep state in order to perform anomaly handling, maintenance work, or the like, for example, the processing may fail unexpectedly.

In this regard, with an onboard device according to the embodiment of the present disclosure, the communication unit 15 thereof communicates with the onboard devices included in the onboard network 151. The detection unit 12 detects a new onboard device that is an onboard device newly added to the onboard network 151. In a detected state where the new onboard device has been detected by the detection unit 12, the sleep processing unit 13 transmits a sleep request for transitioning to a sleep state in synchronization with the onboard devices included in the onboard network 151, to the new onboard device via a communication unit 15.

An onboard device according to the embodiment of the present disclosure first detects a new onboard device that is an onboard device newly added to the onboard network 151. Next, in a detected state where the new onboard device has been detected, a sleep request for transitioning to a sleep state in synchronization with the onboard devices in the onboard network 151 is transmitted to the new onboard device.

With such a configuration, it is possible to check in advance whether or not the onboard device newly added to the onboard network has a sleep function for transitioning to a sleep state in synchronization with other onboard devices. Therefore, for example, when processing is to be performed to cause the entire onboard network to transition to a sleep state in order to perform anomaly handling, maintenance work, or the like, for example, the processing can be prevented from failing unexpectedly. Therefore, with the onboard device and the sleep control method according to the embodiment of the present disclosure, it is possible to more reliably perform sleep control on onboard devices in an onboard network.

Note that some or all of the constituent elements and operations of the examples of each onboard device according to the embodiment of the present disclosure can be combined with each other as appropriate.

The foregoing embodiments are to be construed in all respects as illustrative and not restrictive. The scope of the present disclosure is defined by the claims rather than the description above, and is intended to include all modifications within the meaning and scope of the claims and equivalents thereof.

The above description includes the features described in the following supplementary note.

Supplementary Note 1

An onboard device including:
a communication unit configured to communicate with an onboard device included in an onboard network;
a detection unit configured to detect a new onboard device that is an onboard device newly added to the onboard network; and
a sleep processing unit configured to, in a detected state where the new onboard device has been detected by the detection unit, transmit a sleep request for transitioning to a sleep state in synchronization with an onboard device included in the onboard network, to the new onboard device via the communication unit,
wherein the sleep processing unit is configured to, in the detected state, when the communication unit receives, from the new onboard device, a sleep response corresponding to the sleep request, or, in the detected state, when a predetermined time has elapsed after transmitting the sleep request to the new onboard device, set the new onboard device as an existing onboard device included in the onboard network, and transition from the detected state to a normal state,
the onboard device further includes:
a plurality of communication ports; and
a plurality of communication units that are respectively provided in correspondence with the communication ports, and are each configured to relay communication information received from another onboard device via a communication port corresponding thereto, to another onboard device via the communication port corresponding thereto, and
the sleep processing unit is configured to store the sleep function information in the storage unit, for each communication port.

The invention claimed is:

1. An onboard relay device comprising:
a communication unit configured to communicate with an onboard device included in an onboard network;
a detection unit configured to detect a new onboard device that is an onboard device newly added to the onboard network;
a sleep processing unit configured to transmit to the new onboard device via the communication unit a sleep request for transitioning to a sleep state in synchronization with an onboard device included in the onboard network, when the new onboard device has been detected by the detection unit; and
a storage unit configured to store a sleep function information, wherein sleep processing unit is configured to determine whether or not the communication unit has received a sleep response from the new onboard device that corresponds to the transmitted sleep request and updates a sleep information of the new onboard device with the stored sleep function information when the sleep information of the new onboard device does not correspond with the stored sleep information.

2. The onboard relay device according to claim 1, wherein the communication unit is configured to stop operating in the sleep state, and
the sleep processing unit is configured to, in the detected state, when the communication unit receives, from the new onboard device, a sleep response corresponding to the sleep request, perform control so as not to allow the communication unit to transition to the sleep state.

3. The onboard relay device according to claim 1, wherein the sleep processing unit is configured to, in the detected state, when the communication unit receives, from the new onboard device, a sleep response corresponding to the sleep request, transmit a wake-up request for causing an onboard device included in the onboard network to transition from a sleep state to a wake-up state, to the new onboard device via the communication unit.

4. The onboard relay device according to claim 1, wherein the communication unit is configured to stop operating in the sleep state, and
the sleep processing unit is configured to, in the detected state, when the communication unit receives, from the new onboard device, a sleep response corresponding to the sleep request, perform control so as not to allow the communication unit to transition to the sleep state.

5. The onboard relay device according to claim 1, wherein the sleep processing unit is configured to, in the detected state, when the communication unit receives, from the new onboard device, a sleep response corresponding to the sleep request, transmit a wake-up request for causing an onboard device included in the onboard network to transition from a sleep state to a wake-up state, to the new onboard device via the communication unit.

6. The onboard relay device according to claim 2, wherein the sleep processing unit is configured to, in the detected state, when the communication unit receives, from the new onboard device, a sleep response corresponding to the sleep request, transmit a wake-up request for causing an onboard device included in the onboard network to transition from a sleep state to a wake-up state, to the new onboard device via the communication unit.

7. A sleep control method for an onboard device that is capable of communicating with another onboard device included in an onboard network, the sleep control method comprising the steps of:
detecting a new onboard device that is an onboard device newly added to the onboard network;
in a detected state where the new onboard device has been detected, transmitting a sleep request for transitioning to a sleep state in synchronization with an onboard device included in the onboard network, to the new onboard device;
determining whether or not the communication unit has received a sleep response from the new onboard device that corresponds to the transmitted sleep request transmitted and updating a sleep information of the new onboard device with the stored sleep function information when the sleep information of the new onboard device does not correspond with the stored sleep information.

* * * * *